| (12) | United States Patent | (10) Patent No.: | US 7,767,909 B2 |
|---|---|---|---|
| | Krabs et al. | (45) Date of Patent: | Aug. 3, 2010 |

(54) TUBULAR TERMINAL FOR A CABLE

(75) Inventors: Raymond Krabs, Duesseldorf (DE); Gerhard Lohmeier, Cologne (DE); Attila Z. Kis, Austin, TX (US); Jens Weichold, Erkelenz (DE); Michael Petry, Almutstr (DE); Giuliano Bolcato, Paderno Dugnano (IT); Bernd Schubert, Cologne (DE); Friedrich A. Busemann, Amelinghausen (DE); Thomas Herdtle, Inver Grove Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 12/298,552

(22) PCT Filed: Apr. 23, 2007

(86) PCT No.: PCT/US2007/067174

§ 371 (c)(1),
(2), (4) Date: Oct. 27, 2008

(87) PCT Pub. No.: WO2007/130811

PCT Pub. Date: Nov. 15, 2007

(65) Prior Publication Data

US 2009/0181583 A1 Jul. 16, 2009

(30) Foreign Application Priority Data

May 5, 2006 (EP) .................................. 06113562
Sep. 8, 2006 (EP) .................................. 06120357

(51) Int. Cl.
*H01R 4/00* (2006.01)

(52) U.S. Cl. .................................. 174/84 R; 174/84 C
(58) Field of Classification Search ............... 174/84 R, 174/94 R, 84 C, 88 C; 438/738, 750
See application file for complete search history.

(56) References Cited

U.S. PATENT DOCUMENTS 3,515,798 A 6/1970 Sievert
3,708,611 A * 1/1973 Dinger .................... 174/84 C (Continued)

FOREIGN PATENT DOCUMENTS

CA 2031262 6/1991

(Continued)

*Primary Examiner*—Michael C Zarroli
(74) *Attorney, Agent, or Firm*—Melanie G. Gover; Dean M Harts

(57) ABSTRACT

The tubular terminal for a cable, in particular a medium or high voltage cable, comprises a first connector having at least one terminal end for connecting to at least one mating second connector adapted to be connected to a cable and engaged with the first connector for making electrical contact therewith upon connection of the second connector to the at least one terminal end of the first connector. Furthermore, the tubular terminal comprises a shrinkable sleeve having a first tubular portion and a second tubular portion extending from the first tubular portion. The first tubular portion of the shrinkable sleeve is fixedly arranged around the first connector. The second tubular portion of the shrinkable sleeve is adapted to extend beyond the at least one terminal end of the first connector for covering a mating second connector and cable attached thereto when the second connector is connected to the at least one terminal end of the first connector.

13 Claims, 15 Drawing Sheets

U.S. PATENT DOCUMENTS

| | | | |
|---|---|---|---|
| 3,818,123 A * | 6/1974 | Maltz et al. | 174/88 C |
| 4,135,553 A | 1/1979 | Evans et al. | |
| 4,151,364 A * | 4/1979 | Ellis | 174/84 C |
| 4,179,320 A | 12/1979 | Midgley et al. | |
| 4,503,105 A | 3/1985 | Tomioka | |
| 4,585,607 A | 4/1986 | Krackeler et al. | |
| 4,656,070 A | 4/1987 | Nyberg et al. | |
| 4,935,464 A | 6/1990 | Ona et al. | |
| 5,087,492 A | 2/1992 | Vallauri et al. | |
| 5,098,752 A | 3/1992 | Chang et al. | |
| 5,230,640 A | 7/1993 | Tardif | |
| 5,393,932 A | 2/1995 | Young et al. | |
| 5,495,650 A | 3/1996 | Crepel et al. | |
| 5,577,310 A | 11/1996 | Cheenne-Astorino et al. | |
| 5,584,625 A | 12/1996 | Petri | |
| 5,747,744 A | 5/1998 | Kraft et al. | |
| 5,844,170 A * | 12/1998 | Chor et al. | 174/74 A |
| 6,042,430 A | 3/2000 | Hollick | |
| 6,045,373 A | 4/2000 | Hardt | |
| 6,176,659 B1 | 1/2001 | Hardt et al. | |
| 6,454,598 B1 * | 9/2002 | Burwell et al. | 439/523 |
| 6,472,600 B1 * | 10/2002 | Osmani et al. | 174/75 R |
| 6,506,975 B2 * | 1/2003 | De Buyst | 174/88 R |
| 7,364,454 B2 * | 4/2008 | Brus | 439/441 |

FOREIGN PATENT DOCUMENTS

| | | |
|---|---|---|
| CA | 2059007 | 8/1992 |
| CA | 2107383 | 4/1994 |
| DE | 29 39 600 A1 | 4/1981 |
| DE | 82 19 184 | 7/1982 |
| DE | 38 13 001 A1 | 11/1989 |
| DE | 198 17 219 C1 | 1/2000 |
| EP | 0 435 569 A1 | 7/1991 |
| EP | 0 541 000 A1 | 5/1993 |
| EP | 0 470 388 B1 | 3/1994 |
| EP | 0 638 977 A1 | 2/1995 |
| EP | 0 692 643 B1 | 1/1996 |
| EP | 0 716 474 A1 | 6/1996 |
| EP | 1 158 639 B1 | 11/2001 |
| JP | 7057798 | 3/1995 |
| JP | 11007998 | 1/1999 |
| JP | 11069594 | 3/1999 |
| WO | WO 92/14278 A1 | 8/1992 |
| WO | WO 95/11542 A1 | 4/1995 |
| WO | WO 95/25229 A1 | 9/1995 |
| WO | WO 95/31845 A1 | 11/1995 |
| WO | WO 96/31706 A1 | 10/1996 |
| WO | WO 98/40941 A1 | 9/1998 |
| WO | WO 99/21259 A1 | 4/1999 |
| WO | WO 2004/091066 A1 | 10/2004 |
| WO | WO 2006/002650 A1 | 1/2006 |

* cited by examiner

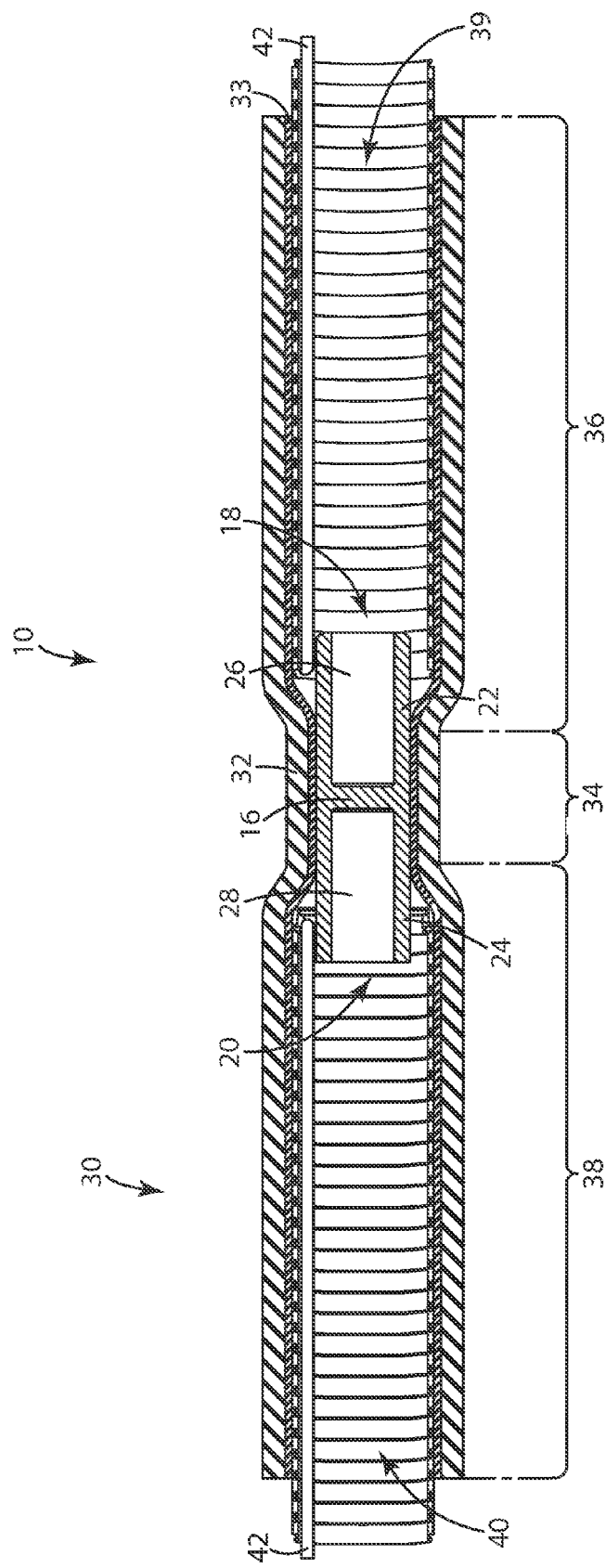

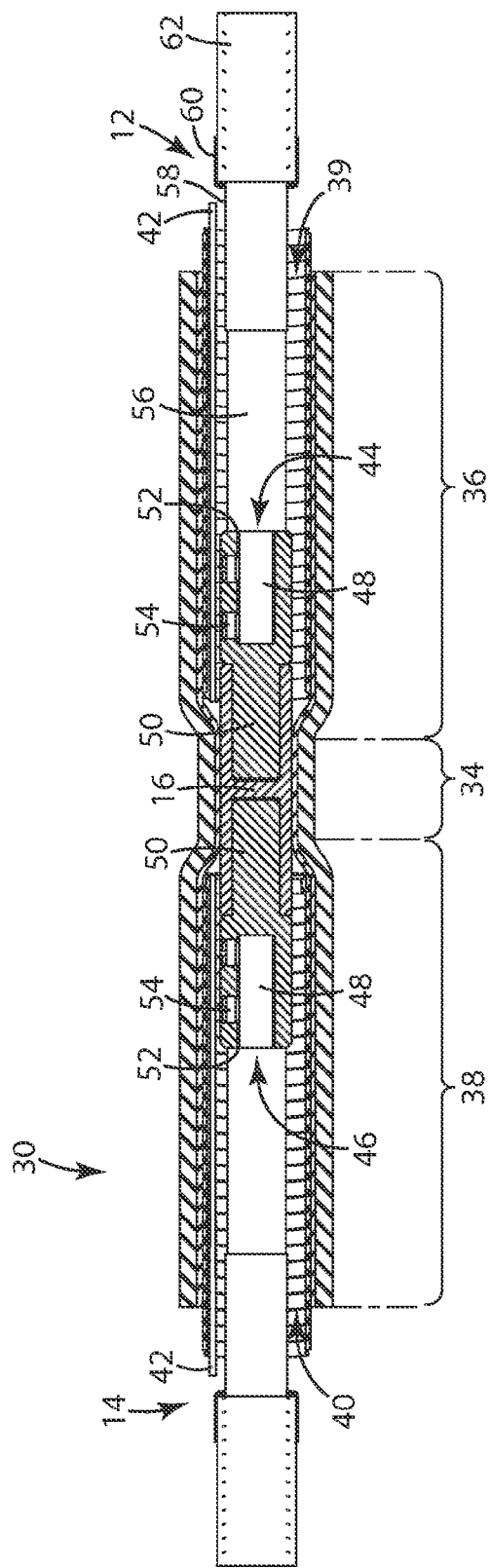

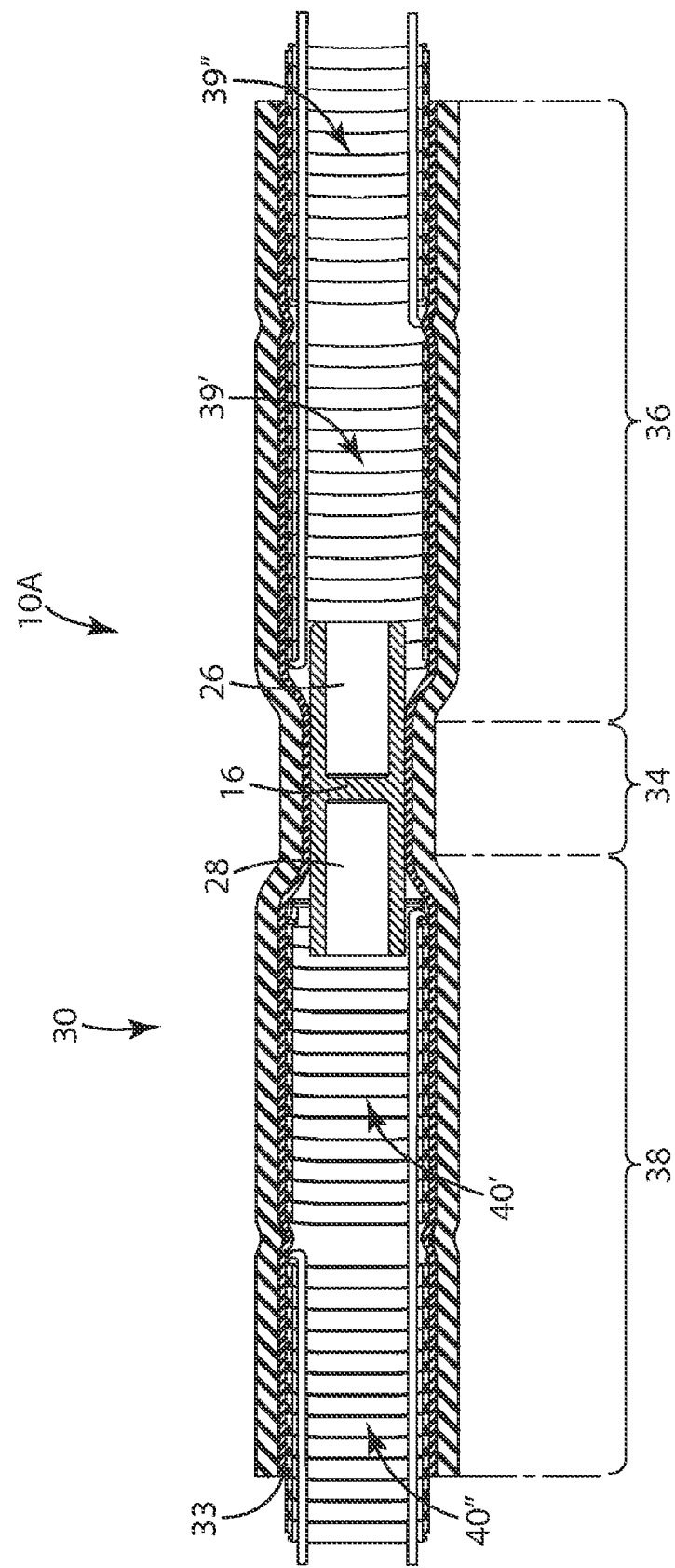

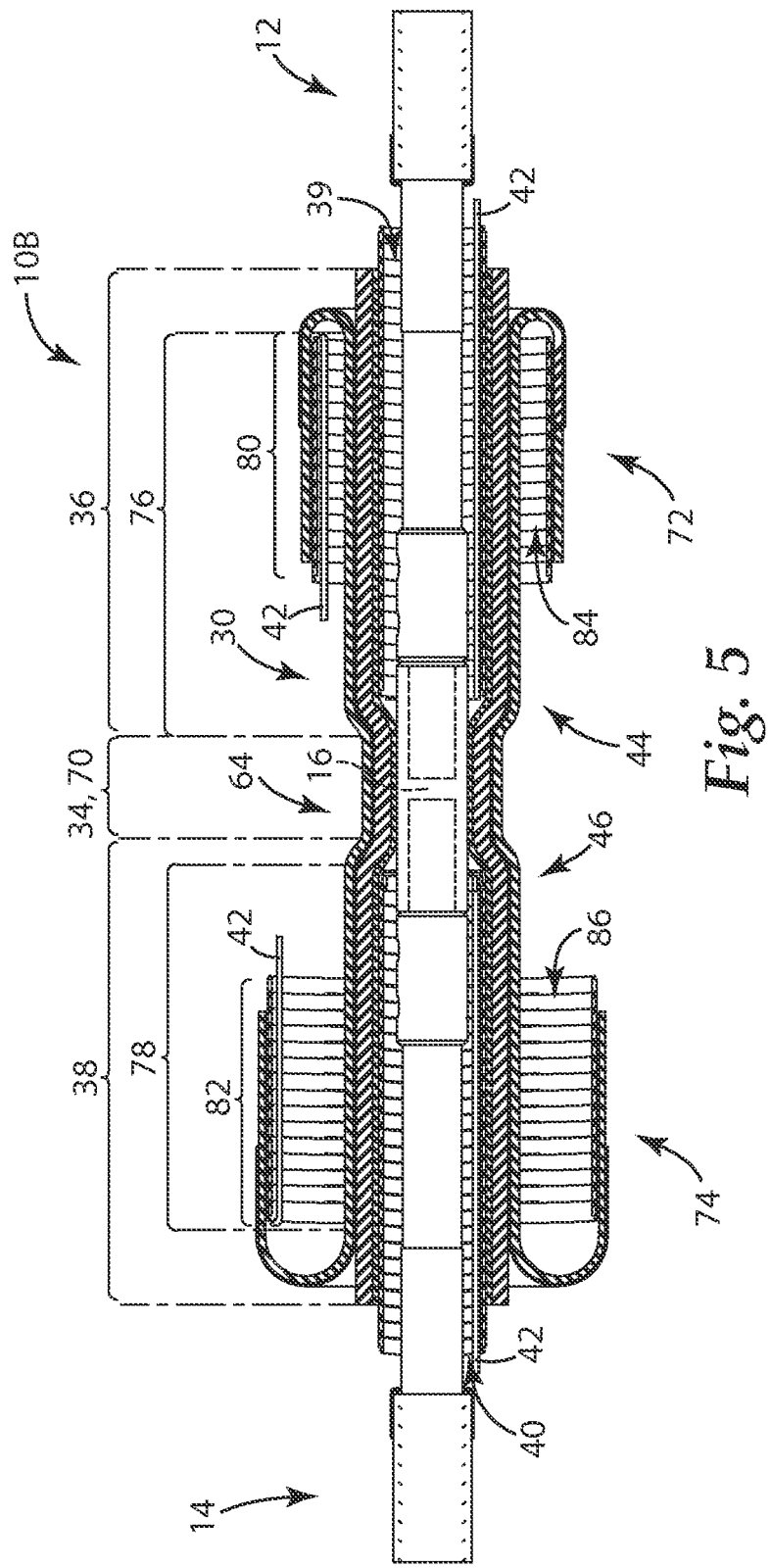

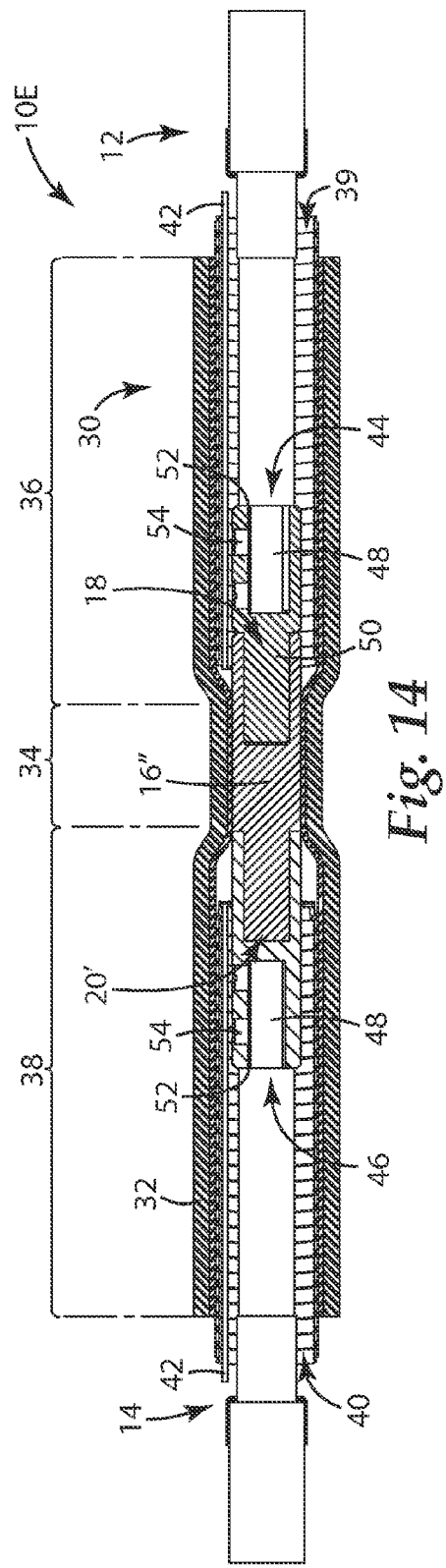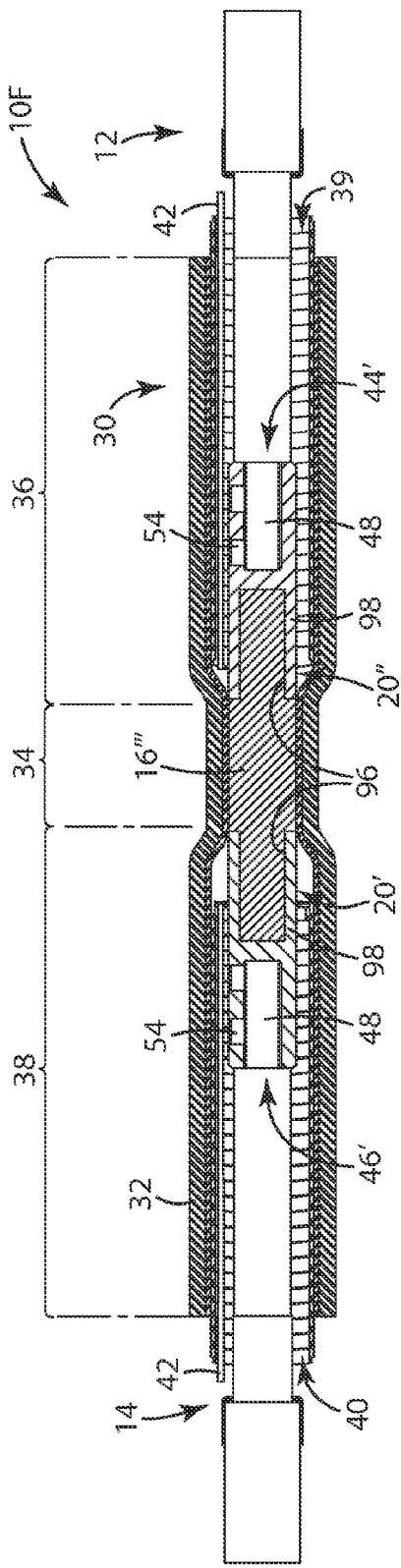

TUBULAR TERMINAL FOR A CABLE

Cross Reference to Related Applications

This application is a national stage filing under 35 U.S.C. 371 of PCT/US2007/067174, filed Apr. 23, 2007, which claims priority to European Application No. 06113562.0, filed May 5, 2006, and European Application No. 06120357.6, filed Sep. 8, 2006, the disclosures of which are incorporated by reference in their entirety herein.

BACKGROUND OF THE INVENTION

1. Field of the Invention

The present invention relates to a tubular terminal for a cable, in particular a medium or high voltage cable. Moreover, the present invention relates to a kit for connecting cables, in particular medium or high voltage cables. Furthermore, the present invention relates to an arrangement at least three tubular terminals for cables.

2. Description of the Prior Art

It is generally known to use radially shrinkable sleeves for enclosing an electrical cable connected to another electrical cable or a stop end. An example of a known radially shrinkable sleeve for covering cable terminations either of cable connectors or stop ends is described in EP-B-0 435 569. The shrinkable sleeve comprises a dielectric material as an intermediate insulating layer, an electric field control inner layer combined with a partially coated inner conductive layer, and an electrically conducting outer layer. Such a multi-layer sleeve is preferably made by extrusion and preferably comprises silicone or EPDM.

When making cable splices or cable end terminations by means of a known radially shrinkable sleeve it is necessary that on one side of the connector a free space is provided (parking position), which corresponds to the complete length of the shrinkable sleeve. After the cable connection is established, the shrinkable sleeve is centered over the cable connection and is then shrunk down either by the application of heat or by the removal of an external or internal support maintaining the shrinkable sleeve in a radially extended state. EP-B-0 541 000 discloses a radially shrinkable sleeve which in its radially expanded state is held by two removable support cores located adjacent each other. Another radially shrinkable sleeve having individual support cores for different sections of the sleeve is disclosed in EP-B-0 966 780. In this known assembly, different sections of the sleeve are concentrically arranged by folding back the sleeve, wherein the individual sections are maintained in their respective radially expanded states by means of removable support cores or similar support elements.

One problem with the known radially shrinkable sleeves is that the user has to arrange the sleeve over the cable connection in a centered manner. EP-B-1 158 639 discloses an electric connector element to which two cables to be connected can be attached by means of screws. The conductors of the cables to be connected are inserted into the connector element and are fixed therein by fastening screws. The connector element is encompassed by an elastic sleeve which extends beyond the two terminal ends of the connector element for surrounding the cables when attached to the connector element. The elastic sleeve in its portion encompassing the connector element is provided with two openings for allowing access to the fastening screws. When the screws are fastened, the two openings are closed by sealing caps. In the known design there is the risk that humidity enters along the caps into the tubular sleeve.

Finally, from DE-A-29 39 600 and DE-A-38 13 001 it is known to use plug-and-socket connectors for connecting medium or high voltage cables, wherein, after having established the electrical connection, a shrinkable sleeve is placed onto the cable connection.

Accordingly, there is a need for an improved cable terminal either in a cable-to-cable connection or stop end application, in particular for medium or high voltage cables, wherein the terminal for the cable is provided with an improved sealing function and allows for facilitated application.

SUMMARY OF THE INVENTION

The present invention provides a tubular terminal for a cable, in particular a medium or high voltage cable, comprising:
  a first connector having at least one terminal end for connecting to at least one mating second connector adapted to be connected to a cable and engaged with the first connector for making electrical contact therewith upon connection of the second connector to the at least one terminal end of the first connector, and
  a shrinkable sleeve having a first tubular portion and a second tubular portion extending from the first tubular portion,
  wherein the first tubular portion of the shrinkable sleeve is fixedly arranged around the first connector, and
  wherein the second tubular portion of the shrinkable sleeve is adapted to extend beyond the at least one terminal end of the first connector for covering a mating second connector and cable attached thereto when the second connector is connected to the at least one terminal end of the first connector.

The tubular terminal for a cable according to the invention comprises a first connector for connecting to at least one mating second connector. The second connector is adapted to be connected to a cable and engaged with the first connector for making electrical contact therewith. A shrinkable sleeve surrounds the first connector and comprises first and second tubular portions. Within the first tubular portion the shrinkable sleeve is fixedly arranged around the first connector, while the second tubular portion of the shrinkable sleeve extends from the first tubular portion and, accordingly, beyond the at least one terminal end of the first connector, at which terminal end the mating second connector can be connected to the first connector. The second tubular portion of the shrinkable sleeve is adapted to extend beyond the at least one terminal end of the first connector for covering the mating second connector and the cable attached thereto when the second connector is connected to the at least one terminal end of the first connector.

Accordingly, in the present invention the shrinkable sleeve completely and integrally encompasses the first connector. The first connector by means of a plug-socket-interface can be connected to the second connector. Therefore, the electrical contact between both connectors is established by plugging the one connector into the other connector. No screws or similar fastening elements to be externally accessible are necessary to establish the electrical contact between both connectors. Therefore, the shrinkable sleeve within its first tubular portion fixedly and integrally arranged around the first connector provides a completely closed seal around the first connector. Since the shrinkable sleeve is pre-assembled with the first connector, its position relative to the first connector always is accurate and exact as is necessary for the respective application of the pre-assembled tubular terminal as a cable-to-cable connection or a cable-to-stop end connection.

The first connector of the tubular terminal according to the invention may have one or more terminal ends configured as sockets or plugs or both, i.e. one terminal end comprises a socket while another terminal end comprises a plug. The first connector typically comprises two terminal ends for connecting to two mating second connectors or for connecting to one mating second connector and a stop end element, respectively. The first connector may also be a branch connector. Further, in this application the connections between the first connector and the at least three mating connectors are configured as plug-and-socket connections. To ensure that a socket-and-plug connection is capable of carrying high electric currents, the prior art offers various contact techniques as e.g. disclosed in EP-A-0 716 474, DE-A-38 13 001, and DE-A-29 39 600.

The first connector can be flexible, partial flexible or rigid. A flexible or partially flexible connector serves for a facilitated application of a cable to be connected to the first connector. This is advantageous when using the preassembled tubular splice in a narrow space.

The mechanical and electrical connection between a cable and the mating second connector, which in turn is to be connected to the first connector, according to one embodiment of the present invention, is realized by crimping or fastening screws or similar fastening elements. Preferably, the fastening screws are configured as shearable screws. Examples of fastening elements suitable for the connection between a cable (or a stop end element) and a second connector are disclosed in WO-A-95/25229, WO-A-96/31706, EP-B-0 470 388, EP-B-0 688 960, EP-B-0 692 643, EP-A-0 769 825, EP-B-0 819 222, EP-B-0 984 176, and U.S. Pat. No. 6,045,373.

In the tubular terminal of the present invention, a cable can very easily be connected to the first connector. The first connector is fixedly connected and arranged within the shrinkable sleeve. A cable attached to a mating second connector can be easily connected to the first connector in that the mating second connector is inserted into the second tubular portion of the shrinkable sleeve so as to make electrical connection with the first connector by simply plugging in the second connector into the first connector, or vice versa. Accordingly, the shrinkable sleeve does not need a parking position or any free space on one of the sides of the first connector. If the pre-assembled tubular terminal is used for connecting two electric cables, both cables, with their associated mating second connectors attached, are inserted from opposite sides into the respective second tubular portions of the shrinkable sleeve or shrinkable sleeves. Namely, if the first connector is provided with two terminal ends at its opposite ends, the respective second tubular portions extend beyond both terminal ends of the first connector. As an alternative, two shrinkable sleeves overlapping each other can be fixedly arranged on the first connector with their respective second tubular portions extending beyond the terminal ends of the first connector.

In one embodiment of the present invention, the first tubular portion of the shrinkable sleeve is shrunk down onto the first connector so as to be fixedly attached around the first connector.

Generally, both heat and cold shrinkable sleeves can be used for the pre-assembled tubular terminal according to the invention. However, in order to avoid the application of heat for shrinking down the sleeve, cold shrinkable materials are preferred for the sleeve. These materials are generally known in the art, and preferably silicone or EPDM is used. In case of a cold shrinkable sleeve, the at least one second tubular portion of the sleeve is held in a radially expanded state by means of a support removable from the second tubular portion. This support can be arranged inside the second tubular portion or outside of the second tubular portion for holding the second tubular portion of the shrinkable sleeve in a radially expanded state. Suitable supports are generally known to those skilled in the art. In particular, it is known to use at least one core adapted to be inserted into the cold shrinkable sleeve for holding it in a radially expanded state, and removed from the cold shrinkable sleeve for shrinking down the sleeve. In the present invention, the core is used to hold the second tubular portion in a radially expanded state. Typically, the core comprises a helically wound ribbon wherein the ribbon at an axial end of the core proximal the terminal end of the first connector is adapted to be removed from the second tubular portion of the cold shrinkable sleeve by tearing or pulling the ribbon out of an axial end of the core facing away from the terminal end of the first connector thereby separating the ribbon from the remainder of the core winding by winding. Examples for various supports as well as cores for holding the second tubular portion in a radially expanded state are disclosed in DE-A-39 43 296, DE,A-42 33 202, WO-A-95/11542, WO-A-95/318 845, EP-A-0 291 213, EP-A-0 399 263, EP-A-0 500 216, EP-A-0 631 117, EP-A-0 631 357, EP-A-0 702 444, EP-B-0 966 780, U.S. Pat. Nos. 3,515,798, 4,135,553, 4,179, 320, 4,503,105, 4,656,070, 5,098,752, and 4,585,607.

The second tubular portion of the sleeve can be arranged so as to extend beyond the terminal end already prior to its application to a cable connected to the first connector and, accordingly, is held in a radially expanded state as mentioned before. In an alternative embodiment, the second tubular portion prior to its application to the cable to be connected to the connector can be folded back over the connector and, if made from a cold shrinkable material, can be held in a radially expanded state. In still another embodiment, the second tubular portion can be wound up around the terminal end so as to form a roll or coil circumferentially surrounding the connector to its terminal end.

In another embodiment of the present invention, the second tubular portion of the shrinkable sleeve is held in its radially expanded state by at least two cores arranged adjacent to each other. These two cores can be separated or flexibly connected in order to provide bendability of the second tubular portion of the shrinkable sleeve for facilitating the connection between the first and second connectors. The at least two cores may have different inside diameters, which further may facilitate the application and use of the pre-assembled tubular terminal according to the present invention.

For a cable splice and cable stop end application it is normally necessary to use two shrinkable sleeves arranged concentrically and one above the other. The first or inner shrinkable sleeve covers the first connector, any mating second connector and the insulation layer around the conductor of the cable or cables. The first shrinkable sleeve is normally provided with the field control electrode layers which are electrically conductive or semiconductive. Around the first or inner shrinkable sleeve there is arranged the second or outer shrinkable sleeve which extends axially beyond the first shrinkable sleeve and is shrunk down onto the outer jacket of the cable or cables. This configuration is used for medium and high voltage cables, wherein an electrically conductive layer of e.g. metal material underneath the outer shrinkable sleeve electrically connects the metallic screen and outer electric shielding layers underneath the outer jacket of the cable or cables. The second shrinkable sleeve is arranged around the first shrinkable sleeve and extends beyond the second tubular portion of the first shrinkable sleeve.

In one embodiment of the present invention, the second shrinkable sleeve comprises a first tubular portion fixedly arranged and, in particular, shrunk down onto the first tubular portion of the first shrinkable sleeve, while a second tubular portion of the second shrinkable sleeve is arranged around the second tubular portion of the first shrinkable sleeve and is adapted to extend beyond the at least one terminal end of the first connector for covering the second tubular portion of the first shrinkable sleeve as well as an outer jacket of the cable. The second shrinkable sleeve can be made from cold or heat shrinkable materials. The second shrinkable sleeve is held along its complete length or along at least subportions of its second tubular portion in a radially expanded state by means of a support arranged inside or outside the second shrinkable sleeve and removable from its second tubular portion. The support used for the second shrinkable sleeve can generally be of the same design and configuration as explained and described above with regard to the support for the second tubular portion of the first shrinkable sleeve.

In one embodiment of the present invention, the second shrinkable sleeve may comprise two sleeve portions overlapping each other on or around the first tubular portion of the first shrinkable sleeve.

In another embodiment of the present invention, the second shrinkable sleeve has a second tubular portion within which the second shrinkable sleeve is wound up so as to form a circumferentially extending roll arranged on the first tubular portion of the first shrinkable sleeve and/or its second tubular portion. If the first shrinkable sleeve comprises a third tubular portion, the second shrinkable sleeve may also comprise a third tubular portion which is wound up similar to its second tubular portion and is arranged on the first tubular portion and/or the third tubular portion of the first shrinkable sleeve. Each circumferentially extending roll of the second shrinkable sleeve may be fixed and secured so as to prevent the roll from unwinding. In particular, if the second (and third, if provided) tubular portion of the first shrinkable sleeve is held in a radially expanded state, the widening section between the first and second (and the first and third) tubular portions of the first shrinkable sleeve will prevent or will help to prevent the roll or rolls from inadvertently unwinding.

In a further embodiment of the present invention, the tubular terminal may be pre-assembled in that the first connector is arranged in the first tubular portion of the (first) shrinkable sleeve prior to the use of the tubular terminal for connecting a cable.

As described before the shrinkable sleeve comprises in its mounted state an inner layer which is electrically conductive or semi conductive and a dielectric layer of e.g. silicone or ethylene propylene diene monomer rubber (EPDM). Those shrinkable sleeves which can be made of heat or cold shrinkable materials are generally known to those skilled in the art. They may be fabricated in molding respectively an extrusion process. To get a sleeve with two layers a standard coextrusion process may be used: you extrude e.g. the inner electrically conductive or semi conductive layer and the outer dielectric layer on top of it. It is also possible to produce a shrinkable sleeve in a first step with an electrically conductive or semi conductive layer on top of a dielectric layer. In this case you have in a second step to reverse the sleeve at least partially before mounting it on the connector.

In a further embodiment of the invention, a radio frequency identification (RFID) tag may be integrated into the tubular terminal. Such RFID tag can save information about the parts it is related to, you can write information on the RFID tag during the life time of the parts it is related to and you can read the information saved on the RFID tag. The RFID tag can be integrate in the tubular terminal of the invention during the production. At that time the first information can be added on the tag like information about the connector, production date etc. A preferred location for the integration of the RFID tag would be the area above the first connector, especially where the first and second shrinkable sleeves are fixedly arranged around the first connector, which means that there is a constant radial pressure between the shrinkable sleeve and the connector. That would have the advantage that no mechanical pressure like extending, stretching or compressing will be applied to the tag during the installation and that no additional work steps are necessary during the installation to integrate the tag. The tag can be integrated within one of the sleeves either the first or the second shrinkable sleeve. It is important that the tag will not be integrated underneath a layer with shielding characteristics.

BRIEF DESCRIPTION OF THE DRAWINGS

A full and enabling disclosure of the present invention, including the best mode thereof, enabling one of ordinary skill in the art to carry out the invention, is set forth in greater detail in the following description, with reference to the accompanying drawings in which FIG. 1 is a cross-sectional view of a first embodiment of a pre-assembled tubular terminal for electrically connecting two cables, FIG. 2 is a cross-sectional view of the device according to FIG. 1 with the two cables electrically connected to each other, but with the shrinkable sleeve in its second tubular portions still held in radially expanded state, FIG. 3 is a cross-sectional view of a complete cable splice with an inner sleeve shrunk down onto the cable connector, and the inner insulating layers of the cables and an outer sleeve shrunk down onto the inner sleeve as well as onto the outer jackets of the cables, FIG. 4 shows a cross-sectional view of another embodiment of the present invention having two individual cores for supporting each of the respective second tubular portions of the shrinkable sleeve, FIG. 5 shows a third embodiment of the present invention with an inner sleeve and an outer sleeve shrunk onto the inner sleeve and having end subportions folded back so as to face each other and held in a radially expanded state by separate supports, FIG. 14 is a cross-sectional view of a further embodiment of a pre-assembled tubular terminal for a cable having a connector with a socket terminal end and a plug terminal end, FIG. 15 is still a further embodiment of a pre-assembled tubular terminal for a cable with a connector having plugs at its two terminal ends.

DESCRIPTION OF PREFERRED EMBODIMENTS

Figure 6:
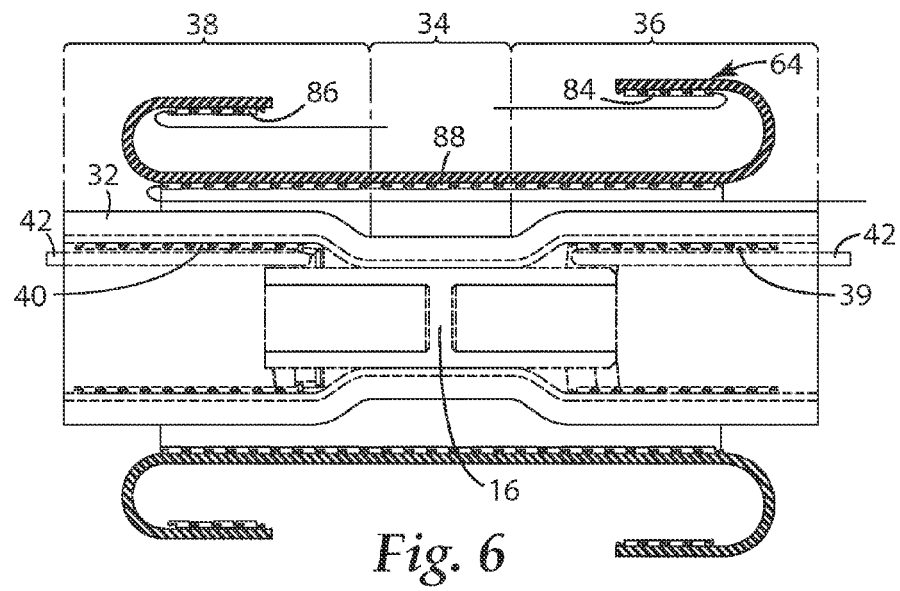
FIGS. 6 to 10, show individual further embodiments of various combinations of a pre-assembled tubular terminal for a cable splice having an inner sleeve and an outer sleeve, wherein the outer sleeves have different configurations.

Herein below diverse embodiments of the present invention are described and shown in the drawings wherein like elements are provided with the same reference numerals.

FIGS. 1 to 3 show a first embodiment of a tubular terminal according to a pre-assembled tubular terminal 10 for a cable splice for connecting two medium or high voltage cables 12,14. The pre-assembled tubular terminal 10 comprises a first connector 16 having two terminal ends 18,20 on its opposite sides. These terminal ends 18,20 comprise sockets 22,24 defining receiving spaces 26,28. Accordingly, the first connector 16 in this embodiment is a socket connector. In the drawings the tubular terminals are shown in a pre-assembled state which as such relates to a preferred embodiment of the invention.

The first connector 16 is arranged within a (first) shrinkable sleeve 30 having a dielectric layer 32 of e.g. silicone or EPDM with an inner layer 33 which is electrically conductive or semiconductive. Those shrinkable sleeves 30 which can be made from heat or cold shrinkable materials are generally known to those skilled in the art.

The shrinkable sleeve 30 comprises a first tubular portion 34 and second and third tubular portions 36,38 arranged on both sides of the first tubular portion 34. Within its first tubular portion 34, the sleeve 30 is fixedly connected to the first connector 16 such that, in this embodiment, the shrinkable sleeve 30 with its first tubular portion 34 is shrunk down on the first connector 16. The second and third tubular portions 36,38 extend beyond the second and third terminal ends 18,20 and are held in a radially expanded state by means of support cores 39,40. Each support core 39,40 comprises a helically wound ribbon 42, wherein the ribbon 42, at an axial end of the respective support core 39,40 proximal the respective terminal end 18,20 of the first connector 16, is adapted to be removed from the respective second or third tubular portion 36,38 of the shrinkable sleeve 30 by pulling the ribbon 42 out of the axial end of the respective support core 39,40 facing away from the terminal end 18,20. Thereby, the ribbons 42 are separated winding by winding from the remainder of the respective support cores 39,40. This support core technique is generally known to those skilled in the art.

For connecting the two cables 12,14 to the first connector 16, mating second and third connectors 44,46 are attached to the respective conductors 48 of the cables 12,14. As shown in FIG. 2, each of the second and third connectors 44,46 comprises a plug 50 to be inserted into the sockets 22,24 of the first connector 16 and receiving spaces 52 for receiving the cable conductors 48. After insertion into the receiving spaces 52, the conductors 48 can be fixed, i.e. mechanically and, accordingly, electrically connected to the second and third connectors 44,46 by means of shearable screws 54 or by means of crimping the portions of the second and third connectors 44,46 surrounding the cable conductors 48.

For connecting the cables 12 and 14 their various layers have to be peeled off in a manner known to those skilled in the art. In particular, an inner insulating layer 56 has to be peeled off so as to expose the conductor 48 at the end of each cable 12,14. Also, a conductive cable screen 58 surrounding the cable insulation layer 56, a metallic cable screen 60 arranged around the conductive cable screen 58 and an outer cable jacket 62 are peeled off accordingly as is generally known in the field of medium or high voltage cables. When the second and third connectors 44,46 are attached to the conductors 48 of the cables 12,14, the cables 12,14 are inserted from opposite sides into the sleeve 30 until the second and third connectors 44,46 are connected to the first connector 16. For this procedure, no parking space is necessary for the sleeve 30 on one of the sides of the first connector 16.

When the connectors are fit together as shown in FIG. 2, by pulling out the ribbons 42 the support cores 39,40 are removed from the second and third tubular portions 36,38 of the shrinkable sleeve 30. When pulling at a ribbon 42, the respective tubular portion of the shrinkable sleeve starts shrinking down on the first connector and its respective terminal end 18,20, respectively. This is advantageous in that the air within the radially expanded tubular portions of the sleeve 30 will be forced out of the shrinkable sleeve starting at the inner axial end of the respective second or third tubular portion so that no air will be trapped within the second and third tubular portions 36,38 of the shrinkable sleeve when these portions are shrunk down. Thereafter, a second shrinkable sleeve 64 is placed onto the (first) shrinkable sleeve 30. This second shrinkable sleeve 64 comprises an outer dielectric layer 66 which surrounds a metallic screen sleeve 68 arranged between the inner shrinkable sleeve 30 and the outer shrinkable sleeve 64. The inner shrinkable sleeve 30 may include an outer conductive layer (not shown). The fully mounted cable splice comprising all the elements described before is shown in FIG. 3. By means of the inner electrically conductive layer 33 of the sleeve 30 which is an inner stress control layer, the cable conductive screens or shielding layers 58 of the two cables 12,14 are connected. The cable metallic screens 60 of the two cables 12,14 are electrically connected by means of the metallic screen sleeve 68 arranged underneath the outer or second shrinkable sleeve 64.

FIG. 4 shows an alternative embodiment of the pre-assembled tubular terminal 10 according to FIG. 1. In the embodiment according to FIG. 4, the pre-assembled tubular terminal 10A differs from that shown in FIGS. 1 to 3 in that each of the support cores 39,40 have two individual core elements 39',39",40',40". Each of these core elements comprises helically wound ribbon which can be pulled out individually, as shown in FIG. 4. This design offers a certain bendability towards the second and third tubular portions 36,38 of the shrinkable sleeve 30, which facilitates the insertion of the cables to be connected into the opposite ends of the shrinkable sleeve 30. Instead of having two separate core elements for each of the tubular portions 36 and 38 of the shrinkable sleeve 30, both core elements may be helically wound by means of one and the same ribbon such that the individual windings of the ribbon within each of the core elements are connected to each other, while the ribbon within its section connecting the two core elements on its lateral sides is separated from the respective first windings of the adjacent core elements.

FIG. 5 shows a cross-sectional view of a further embodiment of a pre-assembled tubular terminal 10B for a cable splice. In this embodiment, the outer or second shrinkable sleeve 64 is directly shrunk onto the first shrinkable sleeve 30, except for the axial ends of the shrinkable sleeve 64 which extends beyond the inner shrinkable sleeve 30. The outer shrinkable sleeve 64 comprises a first tubular portion 70 which is shrunk onto the first tubular portion 34 of the inner shrinkable sleeve 30. Moreover, the outer shrinkable sleeve 64 comprises second and third tubular portions 72,74 each having a first subportion 76,78 and a second subportion 80,82. Within the first subportion 76,78 the outer shrinkable sleeve 64 is shrunk onto the respective second and third tubular portions 36,38 of the inner shrinkable sleeve 30. The second subportions 80,82 are folded back with respect to the first subportions 76,78 and are held in a radially expanded state by separate support cores 84,86. The second subportions 80,82 of the outer shrinkable sleeve 64 form the end sections by which the outer shrinkable sleeve 64 extends beyond the inner shrinkable sleeve 30. The pre-assembled tubular terminal 10B according to FIG. 5 provides a rather compact configuration although the inner and outer shrinkable sleeves 30,64 are already assembled with each other. Therefore, the outer shrinkable sleeve 64, too does not require any free space on one of the cables 12,14 and on one of the sides of the cable connection.

When using the pre-assembled tubular terminal 10B, after preparation of the cables 12,14 to be connected, the second and third connectors 44,46 are connected to the first connector 16. Thereafter, the second and third tubular portions 36,38 of the inner shrinkable sleeve 30 are allowed to collapse in that the respective support cores 39,40 are removed by pulling at the ribbons 42. Thereafter, the support cores 84 and 86 are removed from the second subportions 80,82 of the outer shrinkable sleeve 64, wherein, when removing the respective support core ribbon 42, the respective second subportion 80,82 has to be displaced and will be displaced towards the cables 12,14 so as to complete the splice.

FIGS. 6 to 10 show various embodiments of the arrangement of the outer shrinkable sleeve 64 relative to the inner shrinkable sleeve 30. According to FIG. 6, the outer shrinkable sleeve 64 is supported by a support element 88 supporting the first tubular portion 70 as well as the first subportions 76,78 of the outer shrinkable sleeve 64, wherein the second subportions 80,82 are supported in the same manner as shown in FIG. 5. In FIG. 6 as well as in FIGS. 7 to 10, the individual support cores and respective portions of the second shrinkable sleeve 64 are shown only schematically.

Figure 7:
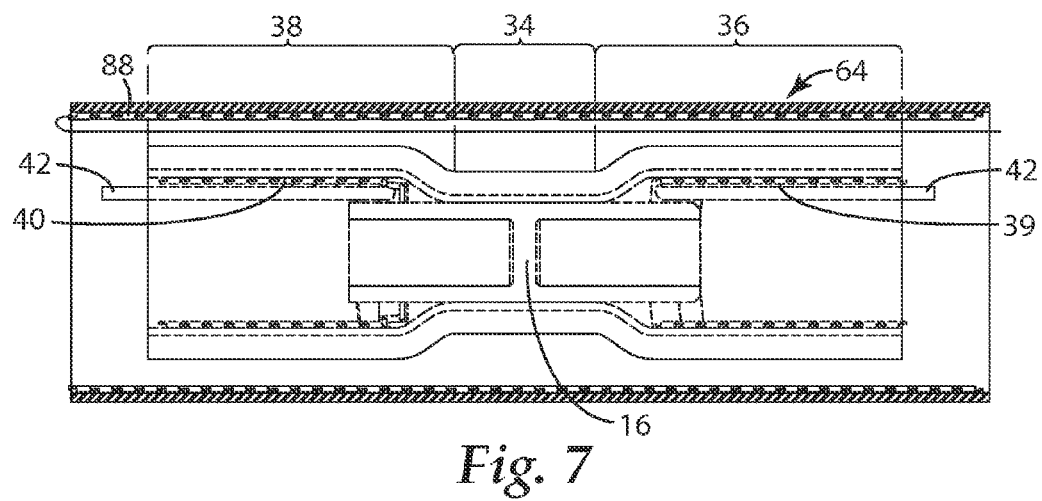

According to FIG. 7, the outer shrinkable sleeve 64 is designed as a straight tube without its axial ends folded back. Along its overall axial length the outer shrinkable sleeve 64 is supported by the support core 88.

Figure 8:
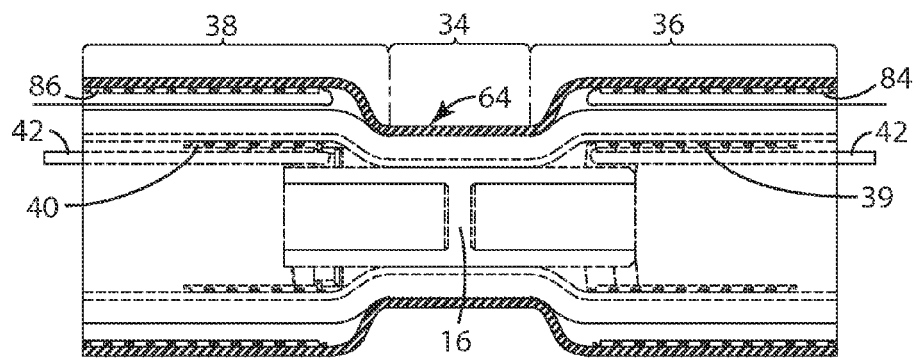

According to the embodiment of FIG. 8, the outer shrinkable sleeve 64 is shrunk down onto and supported by the first shrinkable sleeve 30 only in its first tubular portion 70. The second and third tubular portions of the second shrinkable sleeve 64 are held in a radially expanded state by support cores 84,86 which extend beyond the ends of the inner shrinkable sleeve 30.

Figure 9:
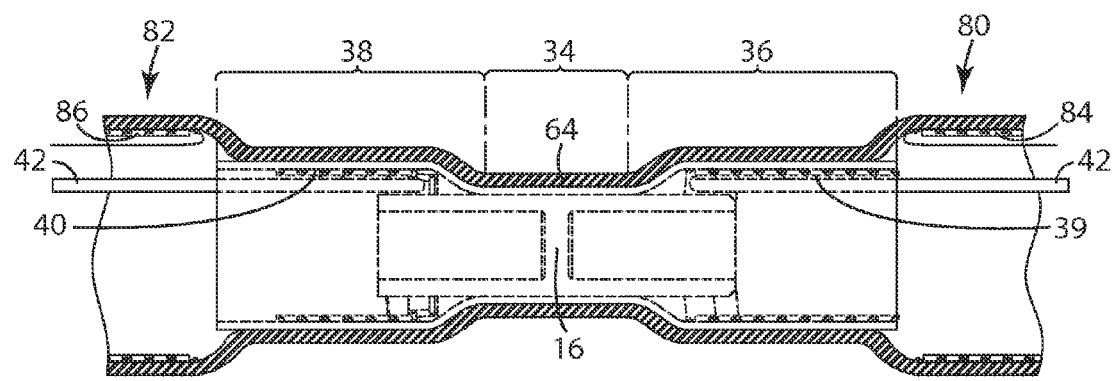

In FIG. 9, the outer shrinkable sleeve 64 is supported by the inner shrinkable sleeve 30 within its first, second, and third tubular portions 34,36,38, while the second subportions 80,82 of the second shrinkable sleeve 64 extend beyond both sides of the inner shrinkable sleeve 30 and are supported by the support cores 84,86.

Figure 10:
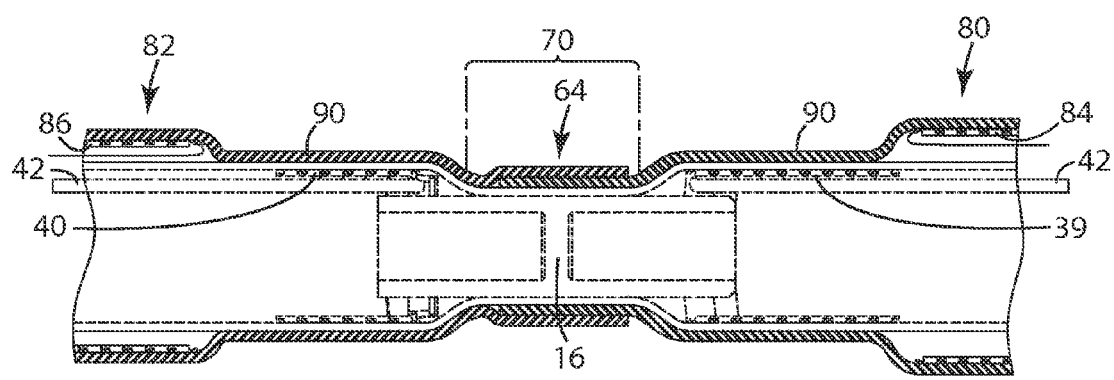

Finally, in FIG. 10, a further alternative of the outer shrinkable sleeve 64 is shown. In this embodiment the outer shrinkable sleeve 64 comprises two sleeve portions 90 which overlap each other within its first tubular portions 70, and are supported by the second and third tubular portions of the inner shrinkable sleeve 30, and are supported by support cores 84,86 within the second subportions 80,82 in which the outer shrinkable sleeve 64 extends beyond the ends of the inner shrinkable sleeve 30.

It is to be noted here that several different arrangements of the inner and outer shrinkable sleeves 30,64 are possible. The examples shown shall not have a limiting aspect. In particular, it is to be noted that an overlapping configuration of two sleeve portions may also be used for the inner shrinkable sleeve 30.

Figure 11:
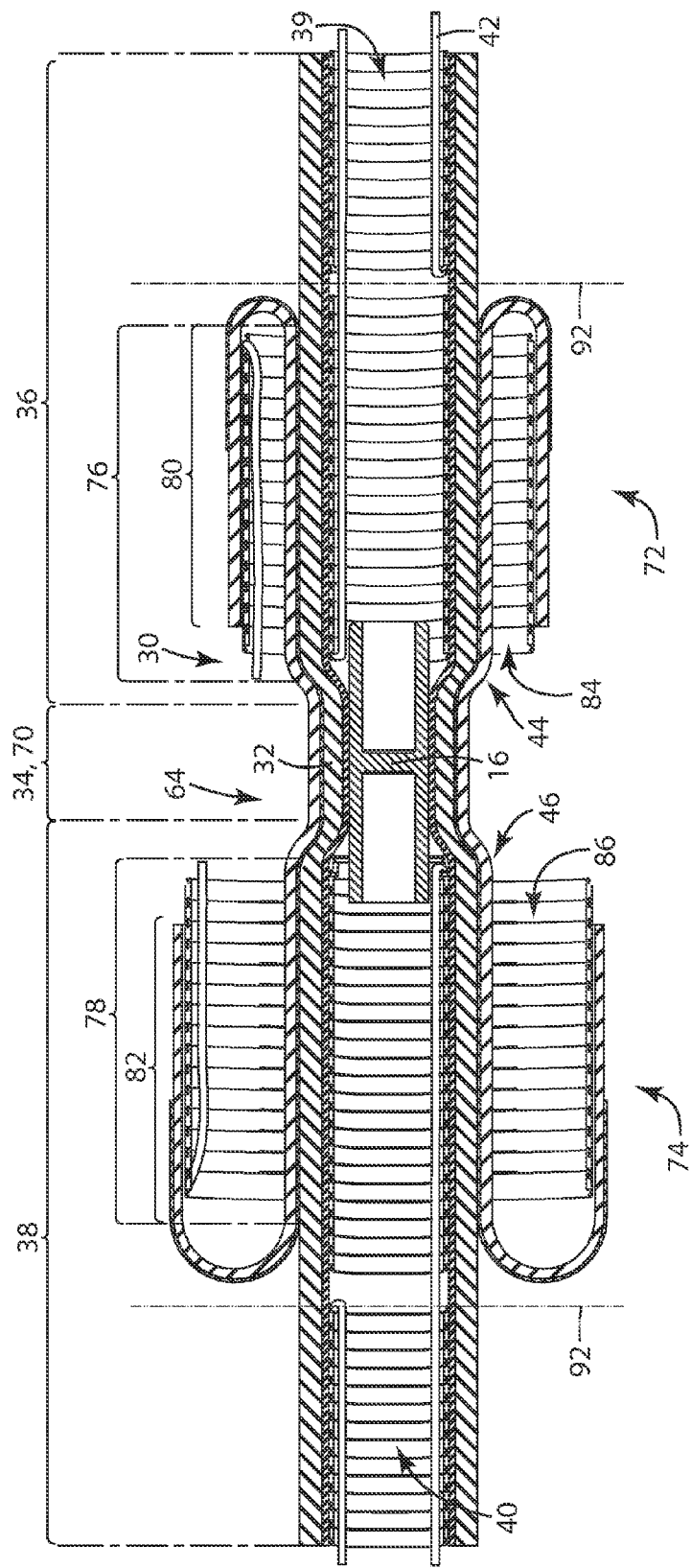
FIG. 11 shows a further embodiment of a combination of a pre-assembled tubular terminal for a cable splice including an outer sleeve, wherein the inner sleeve comprises two support cores for each of its second tubular portions, and the outer sleeve within the separating planes of the respective pairs of support cores for the inner sleeve is folded back with the folded-back subportions of the second or outer sleeve being held in a radially expanded state by separate support cores.

FIG. 11 shows another relative arrangement of the two shrinkable sleeves 30 and 64 which are held in radially expanded states. The embodiment of FIG. 11 comprises a combination of the features of the pre-assembled tubular terminal 10A of FIG. 4 and the features of the outer shrinkable sleeve 64 as shown in FIG. 5. In particular, the planes 92 of separation between the two core elements 39',39" and 40',40", respectively, substantially coincide with the plane in which the second subportions 80,82 of the outer shrinkable sleeve 64 are folded back. In particular, as shown in FIG. 11, the second shrinkable sleeve 64 in its state prior to its application does not extend beyond the planes 92. Accordingly, the pre-assembled tubular terminal of FIG. 11 provides a rather compact design with the end portions of the inner shrinkable sleeve 30 extending beyond the planes 92 being bendable, which facilitates insertion of the cables into the radially expanded ends of the inner shrinkable sleeve 30.

Figure 12:
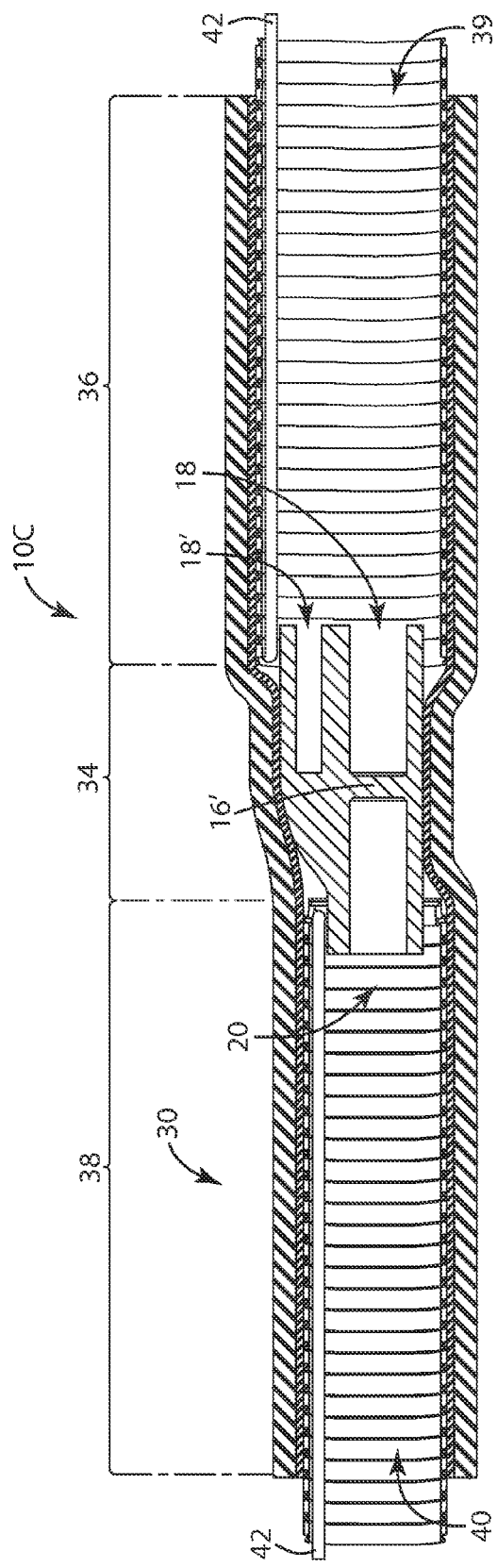
FIG. 12 is a cross-sectional view of a pre-assembled tubular terminal for a branched-off cable splice.

Fig. 12 shows an embodiment of a pre-assembled tubular terminal 10C to be used for a branch. The first connector 16' comprises three terminal ends 18,20,18', wherein two terminal ends 18,18' are located at the one end of the first connector 16', while the third terminal end 20 is arranged at the other end of the first connector 16'. The shrinkable sleeve 30 is fixedly arranged and connected to the first connector 16' within the first tubular portion 34 and extends beyond the first connector 16' within its second and third tubular portions 36,38. Within these portions the shrinkable sleeve 30 is held in a radial expanded state by means of the support cores 39,40. Accordingly, the two adjacent terminal ends 18,18' are surrounded by one and the same support core 39. As known to those skilled in the art, an adaptor (not shown) is arranged between and around the two cables to be inserted through the support core 39 into the terminal ends 18,18'. Thereafter, the support core 39 can be removed by pulling the ribbon 42 out of the second tubular portion 36 of the shrinkable sleeve 30 so that the second tubular portion 36 is shrunk down onto the cables including their adapter. Examples for cable branches can be found in DE-C-198 17 219 and WO-A-99/21259.

Figure 13:
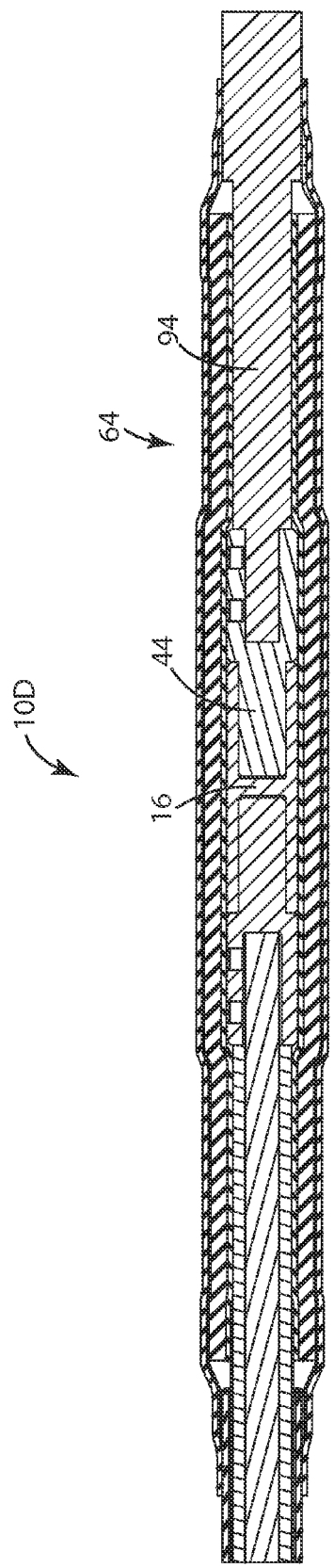
FIG. 13 is a cross-sectional view of a pre-assembled tubular terminal for a cable stop end application with an inner and an outer shrinkable sleeve completely shrunk down onto the cable and stop end element.

In FIG. 13 an embodiment of a pre-assembled tubular terminal 10D for use in a cable stop end application is shown. The overall configuration of the pre-assembled tubular terminal 10D is identical to that shown in FIG. 1. However, in FIG. 13 a dielectric stop end element 94 is inserted in the second connector 44 which in turn is inserted into the terminal end 18 of the first connector 16. In FIG. 13 the pre-assembled tubular terminal 10D in its fully mounted condition, including the outer shrinkable sleeve 64 is shown.

Fig. 14 shows an example of a pre-assembled tubular terminal 10E which is similar to that of Fig. 2, except for the design of the connectors 16", 46'. In the embodiment of FIG. 14, the first connector 16" is provided with a socket terminal end 18 and a plug terminal end 20'. Accordingly, the second connector 44 comprises a plug 50, while the third connector 46' includes a socket for receiving the plug terminal end 20' of the first connector 16". The second connector 44 as well as the third connector 46' both comprise receiving spaces 52 for receiving the conductors 48 of two cables 12,14 to be connected. As an alternative, as shown in FIG. 13, one of the cables can be replaced by a stop end element if the pre-assembled tubular terminal 10E is used in a stop end application.

Fig. 15 shows a pre-assembled tubular terminal 10F having a first connector 16''' to which the shrinkable sleeve 30 is fixedly attached. Accordingly, the configuration of the pre-assembled tubular terminal 10F is similar to that of Fig. 2, except for the design of the connectors 16''', 44', and 46'. Namely, in FIG. 15 the first connector 16''' comprises two plugs defining its terminal ends 20', 20". Therefore, the second and third connectors 44',46' comprise receiving spaces 96 and sockets 98 for receiving the plugs of the first connector 16'''.

Figure 16:
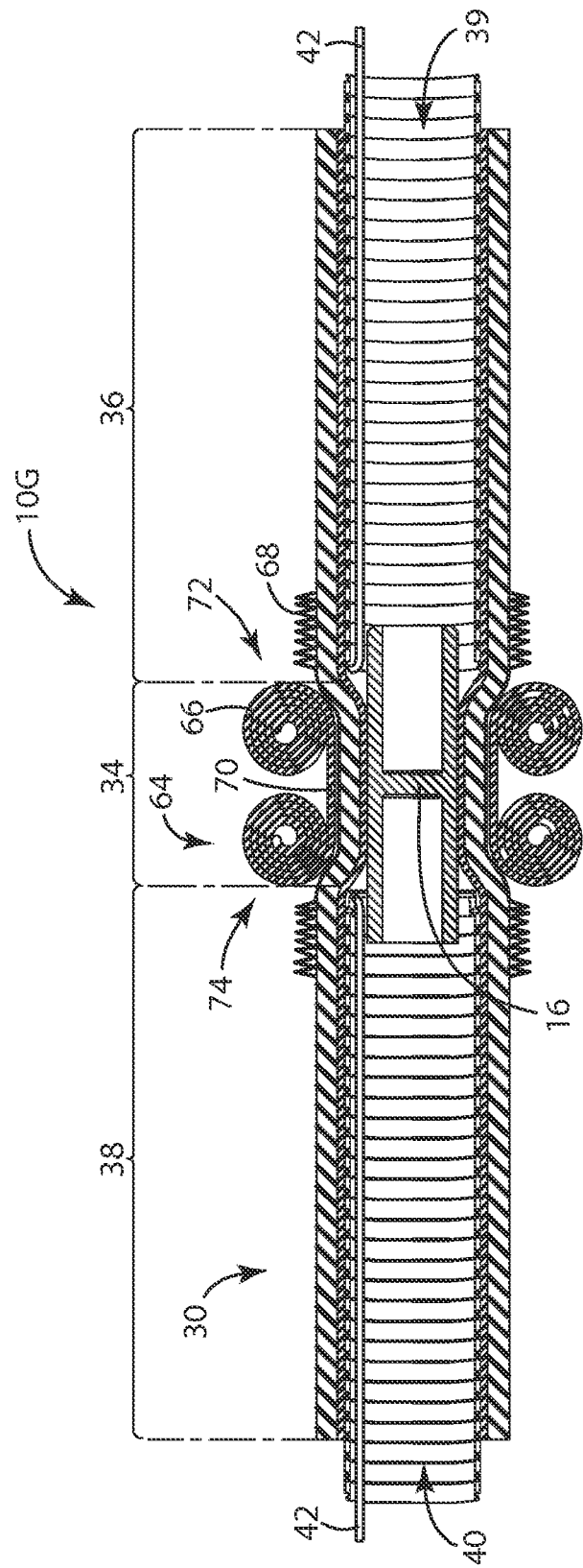
FIG. 16 is a further embodiment of a pre-assembled tubular terminal for a cable splice according to the invention, with an outer shrinkable sleeve wound up at its opposite ends so as to provide two circumferentially extending rolls or coils arranged on the first tubular portion of the inner shrinkable sleeve, with a metallic tubular netting arranged between the rolls and the shrinkable sleeve and axially gathered up.

Another embodiment of a pre-assembled tubular terminal 10G is shown in FIG. 16. In this embodiment the dielectric layer 66 of the second shrinkable sleeve 64 is wound up in its second and third tubular portions 72,74 so as to be arranged within the first tubular portion 34 of the first shrinkable sleeve 30. The widening transitions sections between the first tubular portion 34 and each of the second and third tubular portions 36,38 of the first shrinkable sleeve 30 help to prevent unwinding of the second and third tubular portions 72,74 of the second shrinkable sleeve 64 from inadvertently unwinding. The metallic screen sleeve 68 underneath the dielectric layer 66 of the second shrinkable sleeve 64 extends between the first tubular portions 34 and 70 of the first and second shrinkable sleeves 30,64, respectively, and is gathered up in its remaining portions arranged at both sides of the two wound up tubular portions 72 and 74 as shown in FIG. 16.

For applying the tubular terminal 10G according to FIG. 16, the two cables are first inserted into the support cores 39 and 40 so that the second connectors attached to the cables will make electrical contact with the first connector 16. Thereafter or before the metallic screen sleeve 68 is axially stretched so as to cover the second and third tubular portions 36,38 of the first shrinkable sleeve 30 as well as to extend beyond the axial ends of the first shrinkable sleeve 30. Thereafter, the ribbons 42 are pulled out so that the first tubular sleeve 30 in its second and third tubular portions 36,38 successively will shrink down on the cables. Simultaneously with this process the two wound up second and third tubular portions 72 and 74 of the second shrinkable sleeve 64 will unwind automatically due to the internal tension of the material of the dielectric layer 66. This unwinding process can be controlled manually by holding the rolls or by selectively applying and removing stop elements (not shown) which prevent the rolls from inadvertently unwinding.

Figure 17:
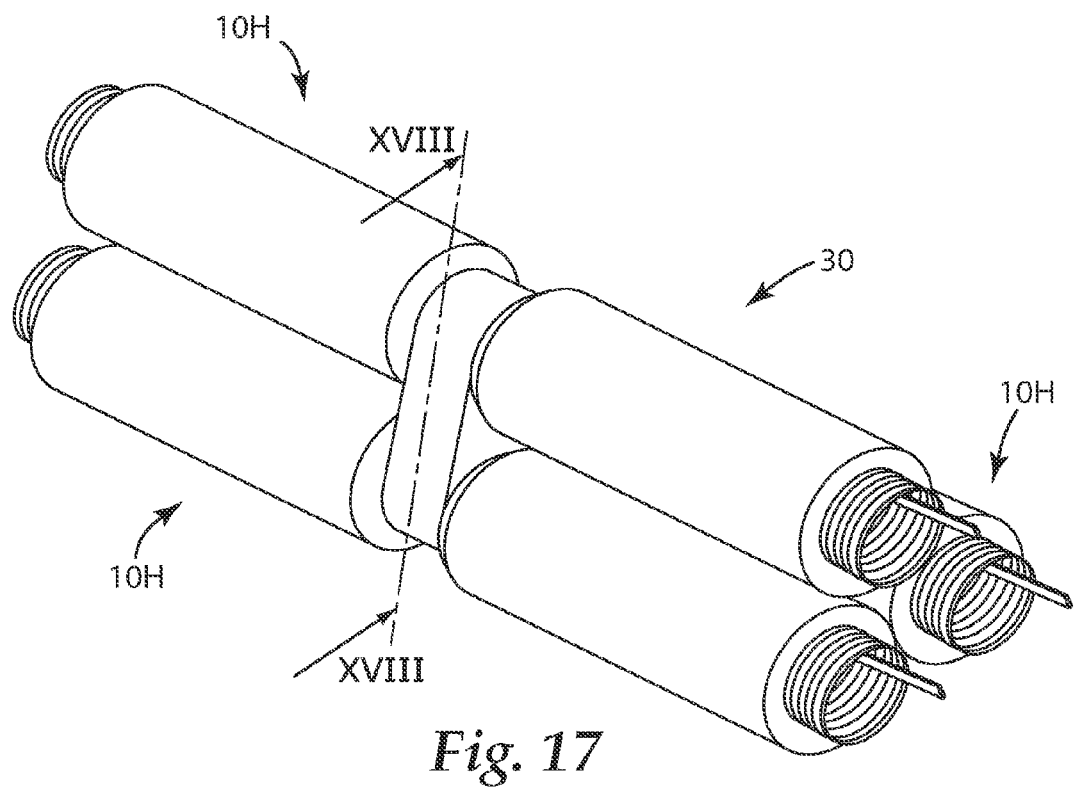
FIG. 17 is a isometric view of an arrangement of three tubular terminals for connecting a three-phase cable arrangement.
Figure 18:
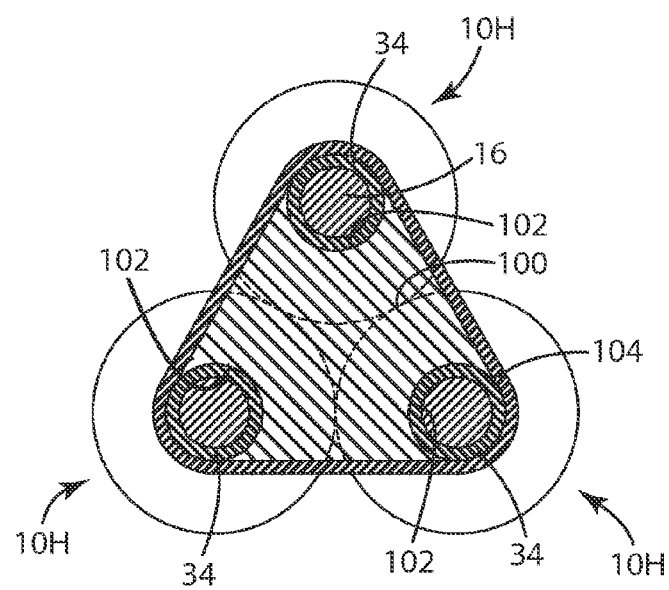
FIG. 18 is a cross-sectional view taken along line XVIII-XVIII of FIG. 17.

In FIGS. 17 and 18 an arrangement of at least three tubular terminals 10H is shown. The tubular terminals 10H can be identical to those shown in FIGS. 1, 4, 14, or 15. This arrangement of at least three tubular terminals 10H can be used for a three-phase power cable arrangement. As shown in FIG. 18, within their narrowed middle portions where the first shrinkable sleeves 30 of the three tubular terminals 10H are shrunk down onto the respective first connectors 16, the three tubular terminals 10H are connected and positioned by means of a positioning element 100 having three outwardly extending receiving portions 102 for receiving the tubular terminals 10H within the first tubular portions 34 of the first shrinkable sleeves 30. The three tubular terminals 10H are arranged close to each other and contact each other within the second and third tubular portions of their shrinkable sleeves 30. Accordingly, the three tubular terminals 10H are arranged in a triangular-shaped manner. A sleeve 104 of tape surrounds the positioning element 100 as well as the first tubular portions 34 of the shrinkable sleeve 30 of the three tubular terminals 10H so that the three tubular terminals 10H are fixedly arranged. Due to the pre-assembled state of the three tubular terminals 10H it is possible to arrange them in the manner shown in FIGS. 17 and 18 so as to connect the power cables of a three-phase grit or utility network the three-phase cables can be arranged close to each other and only a little space is necessary around the three-phase cables when applying the tubular terminal arrangement of FIGS. 17 and 18.

Figure 19:
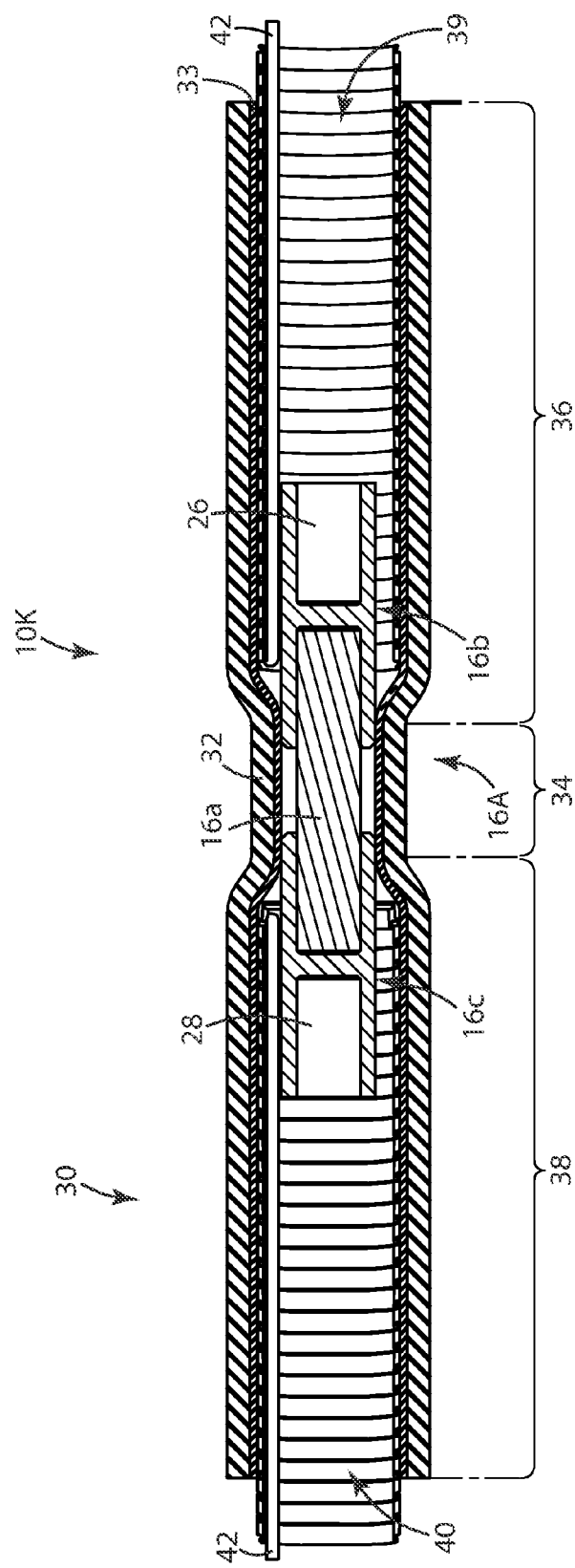
FIG. 19 is another embodiment of a preassembled tubular terminal for a cable splice similar to that according to FIGS. 1 to 3 and having a flexible first connector.

Fig. 19 shows another embodiment of a preassembled tubular terminal 10K for a cable splice similar to that according to FIGS. 1 to 3 and having a flexible first connector 16A. In this embodiment, the first connector 16A comprises a flexible middle section 16a formed e.g. from a multi-wire cable to which ends socket connector elements 16b and 16c are fixedly attached by e.g. crimping. The two socket connector elements 16b and 16c comprise the receiving spaces 26,28 for receiving plugs of cables (not shown) to be connected to the connector elements 16c, 16b for electrically connecting the cables.

Figure 20:
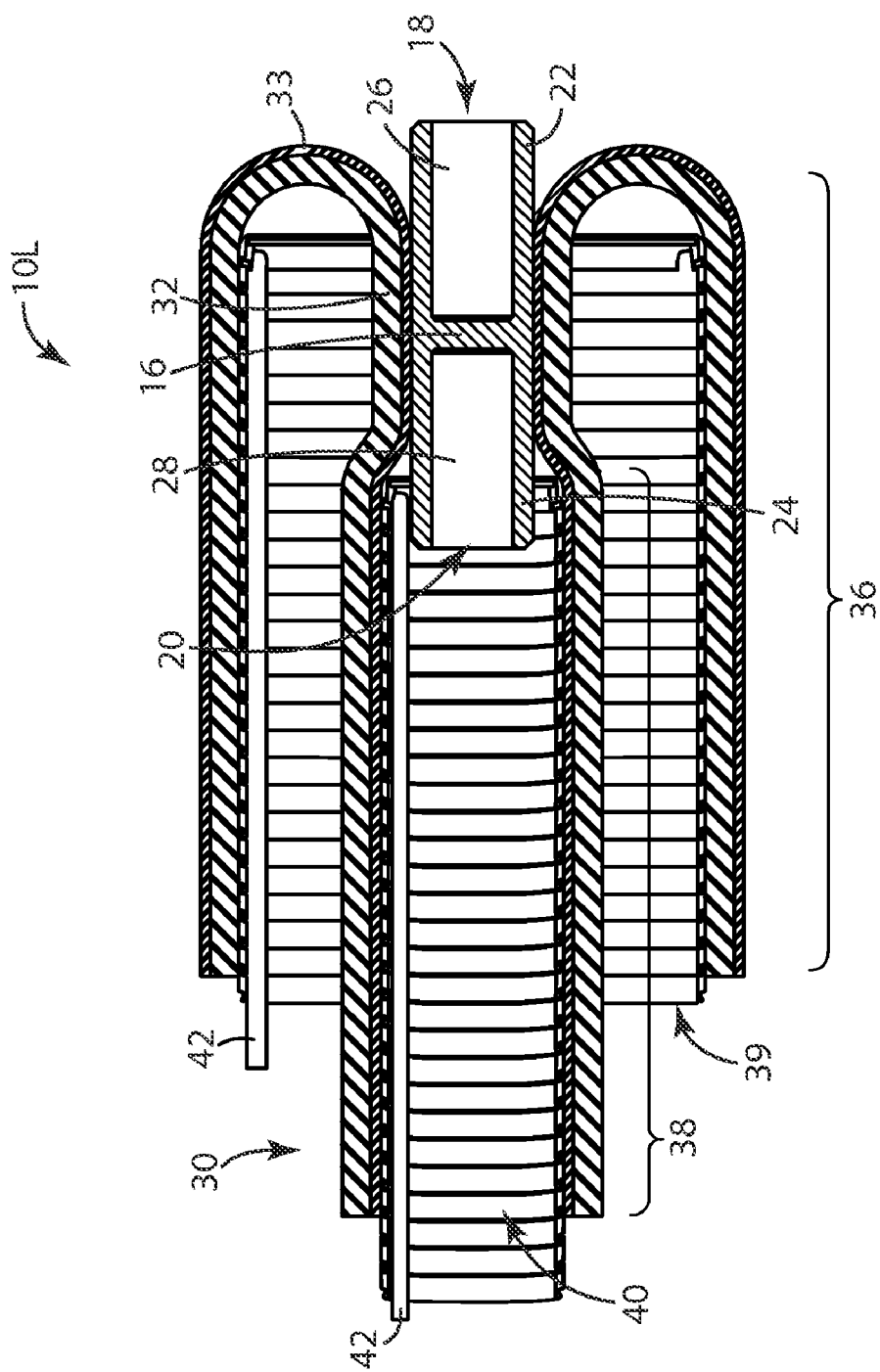
FIG. 20 is still a further embodiment of a preassembled tubular terminal for a cable splice similar to that of FIGS. 1 to 3 wherein one of the tubular portions of the inner sleeve adapted to extend beyond the associated terminal end of the first connector is folded back so as to surround the first connector and within its folded back portion is held in a radially expanded state by a support core.

FIG. 20 shows a further embodiment of a preassembled tubular terminal 10L for a cable splice similar to that of FIGS. 1 to 3 wherein one of the tubular portions 36,38 of the inner sleeve 30 adapted to extend beyond the associated terminal end 22,24 of the first connector 16 is folded back so as to surround the first connector 16 and within its folded back portion is held in a radially expanded state by a support core 39. In this embodiment, one of the second or third tubular portions (in this case the second tubular portion 36) is folded back over the first connector 16 and partially the other of the second and third tubular portion (in this case the third tubular portion 38). This folded construction serves for a shortened longitudinal extension of the preassembled tubular terminal which can be advantages in application within narrow and small spaces.

Figure 21:
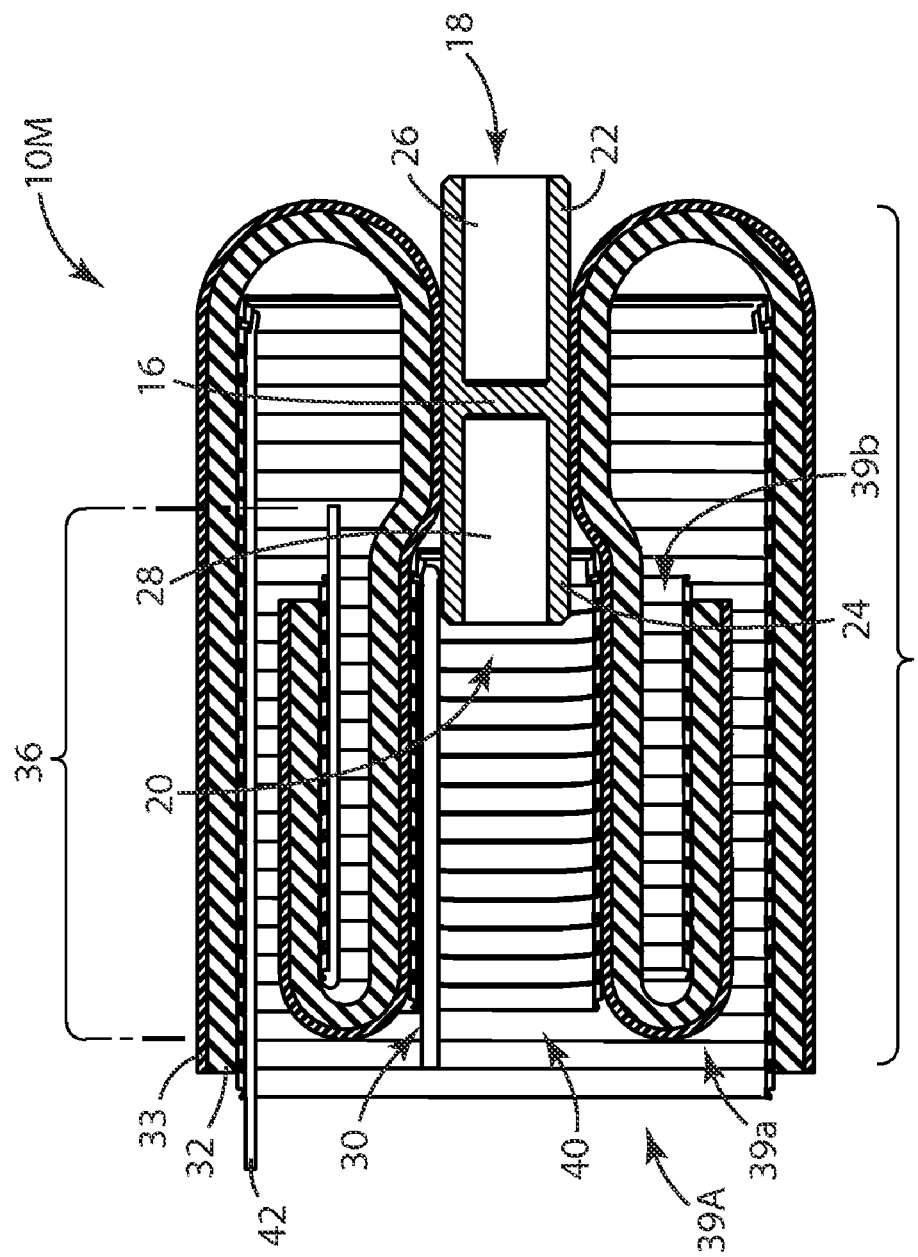
FIG. 21 is a further embodiment of a preassembled tubular terminal for a cable splice similar to that of FIG. 20 wherein the tubular portions of the inner sleeve adapted to extend beyond the respective associated terminal ends of the first connector are folded back and nested within its folded back portion which are held in a radially expanded state by respective support cores.

Fig. 21 shows is a further embodiment of a preassembled tubular terminal 10M for a cable splice similar to that of FIG. 20 wherein the tubular portions 36,38 of the inner sleeve 30 adapted to extend beyond the respective associated terminal ends 22,24 of the first connector 16 are folded back and nested within its folded back portion which are held in a radially expanded state by respective support cores 39A,40. The support core 40 for the third tubular portion 38 of the sleeve 30 is arranged as to separate core portions 39a and 39b supporting the respective coaxially arranged subportions of the third tubular portion 38. By way of the nested arrangement of the folded back portions of both the second and third tubular portion 36 and 38 of the shrinkable sleeve 30 the overall longitudinal extension of the preassembled tubular terminal can be further reduced.

Figure 22:
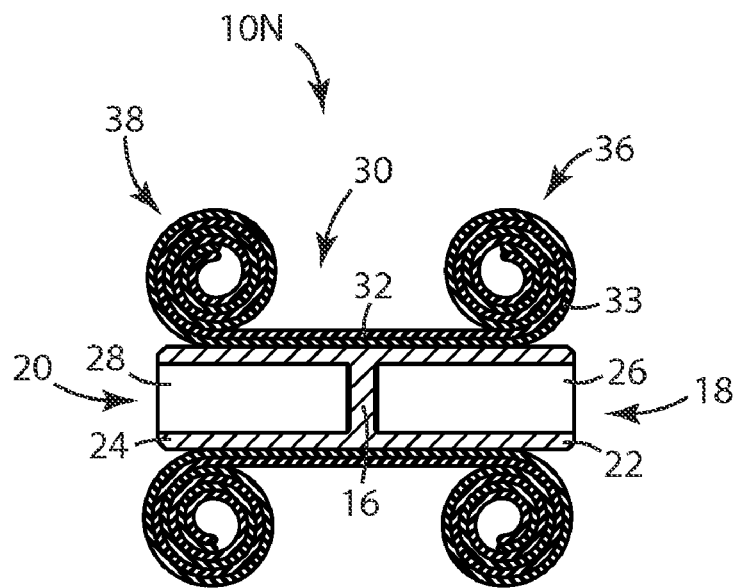
FIG. 22 is another embodiment of a preassembled tubular terminal for a cable splice having its portions of the inner sleeve adapted to extend beyond the associated respective terminal ends wound up so as to provide two circumferentially extending rolls or coils arranged on the first connector.

FIG. 22 shows another embodiment of a preassembled tubular terminal 10N for a cable splice having its portions of the inner sleeve 30 adapted to extend beyond the associated respective terminal ends 22,24 wound up so as to provide two circumferentially extending rolls or coils arranged on the first connector 16. The second and third tubular portion 36 and 38 of the inner sleeve 30 are rolled up as shown in FIG. 16 for the end portions of the outer sleeve and can be secured in these states by means of stop elements e.g. formed as annular elements having sections pushed between the rolls and the connector at its terminal ends.

Figure 23:
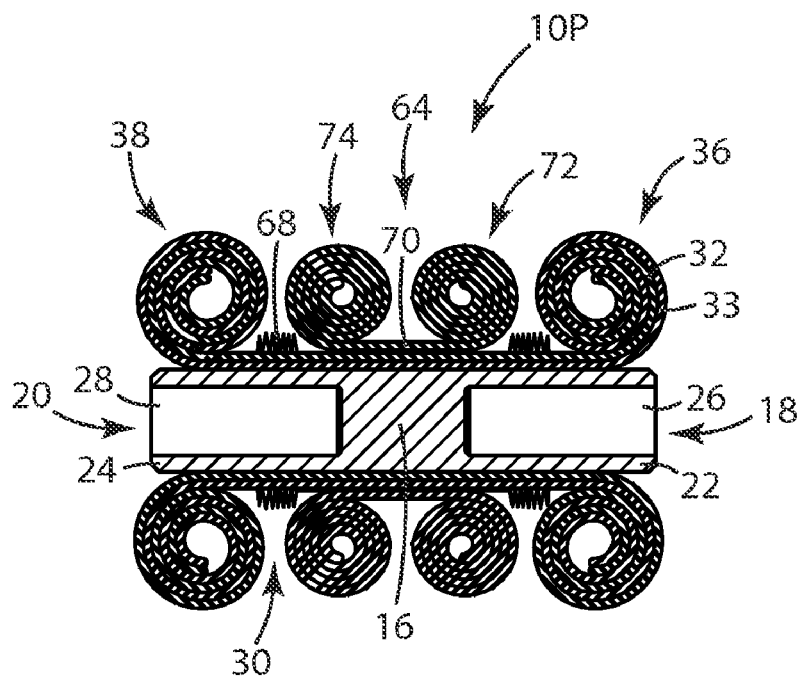
FIG. 23 is yet another embodiment of a preassembled tubular terminal for a cable splice similar to that of FIG. 22 and comprising an outer sleeve also wound up at its ends with a conductive netting arranged between the inner and outer sleeve and gathered up between adjacent rolls or coils at each end of the inner and outer sleeves.

Finally, FIG. 23 shows yet another embodiment of a preassembled tubular terminal 10P for a cable splice similar to that of FIG. 22 and comprising an outer sleeve 64 also wound up at its ends with a conductive netting 68 arranged between the inner and outer sleeve 30,64 and gathered up between adjacent rolls or coils at each end of the inner and outer sleeves 30,64. Here both the inner and outer sleeves 30,64 are rolled up at there two respective ends. The rolls of the outer shrinkable sleeve 64 are arranged within the area defined by the rolls of the inner shrinkable sleeve 30. Both pairs of rolls or at least the outer pair of rolls of the inner sleeve 30 can be secured by stop elements as described above for the embodiment of FIG. 22.

With reference to all described embodiments, but especially with reference to the embodiment described in FIG. 20 it should be mentioned that the inner sleeve 30, comprising an outer dielectric layer 32 and an inner electrically conductive layer, can be produced in two different ways. In this context the words inner and outer refer to the mounted status of the tubular terminal. According to the first way you extrude the dielectric layer on top of the electrically conductive or semi conductive layer 32. To bring the inner sleeve 30 into the form shown in FIG. 20 the second tubular portion 36 of the inner sleeve 30 is folded back over the third tubular portion 38 of the inner sleeve 30 so as to surround the first connector 16. The second and third tubular portions 36 and 38 of the sleeve 30 are held in their radially expanded states by support cores 39 and 40. During installation after inserting the cables into the terminal and removing the support cores 39 and 40 the second tubular portion 36 is folded back into its original stage.

According to the second way of producing the inner sleeve 30 (reversed producing) you extrude the electrically conductive or semi conductive layer 32 on top of the dielectric layer 33. To bring the inner sleeve into the form shown in FIG. 20 the third tubular portion 38 of inner sleeve 30 is folded into the second tubular portion 36 of the inner sleeve 30 over the connector 16. The second and third tubular portions 36 and 38 of the sleeve 30 are held in their radially expanded states by support cores 39 and 40. During installation after inserting the cables into the terminal and removing the support cores 39 and 40 the second tubular portion 36 is folded over the inserted cable. So the whole inner sleeve 30 is being turned inside out (after the production of the inner sleeve the conductive layer was facing outside; after installation of the tubular terminal the conductive layer is facing inside).

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

The invention claimed is:

1. A tubular terminal for a cable, in particular a medium or high voltage cable, comprising
a first connector having at least one terminal end for connecting to at least one mating second connector adapted to be connected to a cable and engaged with the first connector for making electrical contact therewith upon connection of the second connector to the at least one terminal end of the first connector, and
a cold shrinkable sleeve having a first tubular portion and a second tubular portion extending from the first tubular portion,
wherein the first tubular portion of the cold shrinkable sleeve is fixedly arranged around the first connector,
wherein the second tubular portion of the cold shrinkable sleeve is adapted to extend beyond the at least one terminal end of the first connector for covering the mating second connector and cable attached thereto when the second connector is connected to the at least one terminal end of the first connector, and wherein the second tubular portion of the cold shrinkable sleeve is held in a radially expanded state by a support removable from the second tubular portion, a portion of the support core surrounding a portion of the first connector prior to removal of the support core.

2. The tubular terminal according to claim 1, wherein the support core comprises a helically wound ribbon wherein the ribbon at an axial end of the support core proximal the terminal end of the first connector is adapted to be removed from the second tubular portion of the cold shrinkable sleeve by tearing the ribbon out of an axial end of the support core facing away from the terminal end of the first connector thereby separating the ribbon from the remainder of the support core winding by winding.

3. The tubular terminal according to claim 1, wherein at least two support cores are arranged adjacent to each other within the second tubular portion of the cold shrinkable sleeve.

4. The tubular terminal according to claim 3, wherein the at least two support cores have different diameters.

5. The tubular terminal according to claim 1, wherein the first connector comprises at least one further terminal end for connecting to at least one mating third connector and wherein the cold shrinkable sleeve comprises a third tubular portion extending from its first tubular portion and adapted to extend beyond the at least one further terminal end of the first connector for covering a mating third connector and cable or insulator attached thereto, when the third connector is connected to the at least one further terminal end of the first connector.

6. The tubular terminal according to claim 1, wherein the cold shrinkable sleeve is a first shrinkable sleeve and wherein a second cold shrinkable sleeve is arranged around the first cold shrinkable sleeve, the second cold shrinkable sleeve comprising first and second tubular portions, wherein the first tubular portion of the second cold shrinkable sleeve is arranged around the first tubular portion of the first cold shrinkable sleeve and wherein the second tubular portion of the second cold shrinkable sleeve is adapted to be extended beyond the at least one terminal end of the first connector for covering the second tubular portion of the first cold shrinkable sleeve and an outer jacket of the cable.

7. The tubular terminal according to claim 6, wherein the second tubular portion of the second cold shrinkable sleeve comprises a first subportion located adjacent the first connector and a second subportion located adjacent the first subportion wherein the first subportion is arranged on the second tubular portion of the first cold shrinkable sleeve and the second subportion extends around the first subportion and wherein the second subportion is held in a radially expanded state by a support core removable from the second subportion.

8. The tubular terminal according to claim 5, wherein the third tubular portion of the second cold shrinkable sleeve comprises a first subportion located adjacent the first connector and a second subportion located adjacent the first subportion wherein the first subportion is arranged on the third tubular portion of the first cold shrinkable sleeve and the second subportion extends around the first subportion and wherein the second subportion is held in a radially expanded state by a support core removable from the second subportion.

9. The tubular terminal according to claim 1, wherein the cold shrinkable sleeve is a first cold shrinkable sleeve and wherein a second cold shrinkable sleeve is arranged around the first tubular portion of the first cold shrinkable sleeve, the second cold shrinkable sleeve comprises a first tubular portion arranged around the first tubular portion of the first cold shrinkable sleeve and a second tubular portion wound up as a roll extending circumferentially around the first tubular portion of the first cold shrinkable sleeve and/or its second tubular portion.

10. The tubular terminal according to claim 5, wherein the second cold shrinkable sleeve comprises a third tubular portion wound up as a roll extending circumferentially around the first tubular portion of the first cold shrinkable sleeve and/or its third tubular portion.

11. The tubular terminal according to claim 1, wherein the cold shrinkable sleeve, the first cold shrinkable sleeve and/or the second cold shrinkable sleeve, if provided, each comprises a multi-layer cold shrinkable sleeve having at least one layer of electrically insulative material and at least one layer of electrically conductive or electrically semiconductive material extending fully or partially along the axial length of the cold shrinkable sleeve.

12. The tubular terminal according to claim 1, wherein the first connector comprises at least two terminal ends with one terminal end comprising a connector socket having a receiving space and the other terminal end comprising a connector plug and wherein mating second and third connectors are provided with the second connector comprising a connector plug to be inserted into the receiving space at the one terminal end of the first connector and the third connector comprises a connector socket having a receiving space for receiving the connector plug at the other terminal end of the first connector.

13. An arrangement for connecting cables, comprising at least three tubular terminals according to claim 1, wherein two tubular terminals are arranged side-by-side and a third tubular terminal is arranged above and between the two tubular terminals, wherein a positioning element having outwardly facing receiving portions for receiving the first tubular portions of the cold shrinkable sleeves of the at least three tubular terminals is arranged therebetween.

* * * * *